United States Patent Office 3,461,201
Patented Aug. 12, 1969

3,461,201
GRANULAR PESTICIDAL COMPOSITIONS CONTAINING A FINELY DIVIDED CARBON SUCH AS GRAPHITE
William J. Champion, 12439 S. 69th Court, Palos Heights, Ill. 60463
No Drawing. Filed Feb. 15, 1965, Ser. No. 432,829
Int. Cl. A01n *17/08, 9/36*
U.S. Cl. 424—125      5 Claims

ABSTRACT OF THE DISCLOSURE

Granular pesticidal compositions comprising a pesticidal material as, for instance, aldrin or dieldrin, and a carrier therefor, such as attapulgite granules, said granules being coated with a small percentage of graphite whereby the presence of the compositions on a surface may be readily observable to the naked eye.

---

My invention relates to new and useful improvements in granular pesticidal compositions and, more particularly, to such compositions which contain small proportions of finely divided carbon material, especially graphite, whereby the presence of the granular pesticidal compositions or dusts formed therefrom may be readily observable to the naked eye when even small amounts of said compositions are deposited on the skin, on clothing and on other surfaces.

Pesticidal compositions in granular form are in widespread use. Various of the pesticidally active materials commonly used in such compositions are toxic to humans and, when in contact with the skin, or on clothing from where transfer to the skin readily occurs, are highly injurious. The handling of such compositions, and commercial procedures utilized in applying said compositions to plants and animals, almost inevitably result in spillage, dusting-off or accidental contamination of persons. The nature of the granular pesticidal compositions is such that the presence thereof on clothing, skin or other surfaces is difficult to detect visually by the naked eye. Hence, not infrequently, serious injury to persons has occurred who are required to handle such compositions or who have come in contact with such compositions and have been unable to detect or to recognize the presence thereof on their skins or on their clothing in time to take steps to remove the same by washing or the like before injury occurs. Similar situations obtain with respect to animals as well as to certain plants where contact with a given granular toxic pesticidal composition is detrimental or injurious to such animals and plants.

This invention is predicated on the discovery that the incorporation of small proportions of finely divided or powdered or colloidal carbon material, for instance, lampblack or carbon blacks but especially powdered graphite, into granular pesticidal compositions is highly effective to impart to such compositions the ability to be easily recognized or to be readily observable to the naked eye when said compositions are present on a surface, be it the human or animal skin, clothing, plants or other surfaces.

The finely divided carbon, notably graphite, is advantageously admixed or tumbled with a finished granular pesticidal composition and, during said mixing or tumbling opeartion, the graphite coats the granules of the pesticidal composition. It has been found that the finely divided carbon or graphite has the marked advantage of not penetrating into the pesticide-carrying granules but, rather, is coated or held thereon relatively loosely so that, on coming in contact with the skin or clothing or similar surface, a smudge of carbon or graphite is left on said surface and is readily noticed and, thus, can be given prompt attention to effect removal of the composition by washing or the like. Similarly, in the case, for instance, of granular herbicidal compositions, any spillage in or around seeds, plants, bulbs, etc., is immediately noticed and can readily be corrected before damage or greater damage occurs.

Graphite is particularly advantageous because, in addition to its low cost, it also tends to prevent caking of the granular pesticidal compositions on standing under pressure over prolonged periods of time. Furthermore, the graphite, being held very loosely onto the granules of the pesticide composition, tends to form a certain amount of excess dust which mixes immediately with any dust which may be present around or on the granules, it being well known that conventional granular toxic pesticidal compositions tend to have a certain amount of toxic dust in their makeup. The mixture of the graphite dust and the granule dust is readily observable by the naked eye when it is suspended in the air or when it dusts or settles onto anyone handling or working with the compositions. This relatively small amount of dust presents perhaps the most hazardous danger of working with granular toxic pesticidal compositions, and is the most readily observed when such compositions are treated with graphite or similar finely divided carbon materials in accordance with my present invention. In the case of heretofore known granular pesticidal compositions, the presence on the surface of the skin or clothing of such compositions would normally not be detected and the individual would be endangered by prolonged contact with the toxic pesticide until the end of the work period or until the pesticide made itself evident through irritation or burning of the skin or the clothing of the individual involved.

The amount of finely divided carbon or graphite in the final granular pesticidal formulations or compositions is variable within reasonable limits. Generally, speaking amounts of graphite below about 0.1%, by weight, of the granular pesticidal composition are not too readily visible to the naked eye, and amounts in excess of about 3% are unnecessary and uneconomical. In general, the practical amounts will fall within the range of 0.1 to 3%, with the particularly satisfactory range being from 0.3 or 0.5 to 2%, by weight. The incorporation, for instance, of 1%, by weight, of powdered graphite into a conventional 20% aldrin granular composition, by admixing or tumbling the latter with the graphite just prior to bagging into final packages for shipment and sale, darkens the composition and leaves sufficient amounts of excess graphite on each granule, considered in the mass, so that when said granules are brought in contact with the skin or clothing, by spillage or otherwise, some of the graphite is transferred to said skin or clothing marking it with a black smudge thereby promptly indicating a potentially dangerous condition. Thereupon, washing with soap and water, or even a change of clothing, is indicated.

The granular pesticidal compositions, other than the presence therein, generally as a coating on the granules, of small proportions of a finely divided or colloidal carbon, especially powdered graphite, may be of conventional character, the particle size of the solid carrier of which is usually in the range of 20–80 mesh and in which the content of active pesticidal material is generally within the range of 2 to 35%, by weight preferably from 10 to 25%, by weight, of the composition.

The pesticidal material may be selected from wide groups of insecticides, fungicides, herbicides, nematocides, miticides, rodenticides, and the like, illustrative examples of which are aldrin, isodrin, dieldrin, lindane, DDT, parathion, ethyl parathion, malathion, tetraethyl phosphate, hexamethyl tetraphosphate, benzyl benzoate, methoxychlor, toxaphene, chlordane, endrin, DDVP (dimethyl dichlorovinyl phosphate), ovex, sodium pentachlorphenate, and compatible mixtures of any two or more of said pesticides or other pesticides. The invention is especially useful in those instances where the pesticide is highly toxic to humans as, for instance, in the case of pesticide granules such as those containing methyl or ethyl parathion, compound 4072, diazinon, or such chlorinated compounds as aldrin or heptachlor.

Where said pesticides are normally solid and soluble in organic solvents, they are conveniently dissolved in appropriate organic solvents and incorporated with the granular carrier, preferably by being sprayed thereon while the granular carrier is being tumbled or mixed in a suitable mixer such as is commonly used in making granular pesticidal compositions. Among the organic solvents which are conventionally used for the pesticidal materials are kerosene, methyl naphthalenes, ethylnaphthalenes, benzene, toluene, pine oil, heavy aromatic naphthas, xylene, 2-methyl pentanediol-1,2; dipropylene and tripropylene glycol methyl ethers, and petroleum fractions of various types commonly containing of the order of 20% or more of aromatic hydrocarbons, and compatible mixtures of two or more of such or other organic sovents.

Various carriers which are commonly used in making granular pesticidal compositions are readily available and comprise, generally, clays such as kaolin clays, attapulgite clays, montmorillonite clays, vermiculites, diatomaceous earths and the like. Attapulgite is generally very satisfactory.

The following examples are illustrative of particularly preferred embodiments of the invention. They are, obviously, not to be construed as in any way limitative of the invention since numerous other embodiments can readily be evolved in the light of the guiding principles and teachings provided herein.

Example 1

106 pounds of technical aldrin (95% active) are dissolved in 61 pounds of heavy aromatic naphtha (HAN—Humble Oil Company), heat being supplied to increase the rate of solution. The resulting 60% aldrin solution is blended with 100 pounds of technical ethyl parathion.

709 pounds of attapulgite granules 15/30 mesh AA RVM are placed in a closed tumbler mixer and, while the mixer is in operation, 14 pounds of a 50% solution of urea in water are sprayed onto said attapulgite granules, the urea serving a known function of inhibiting decomposition of the aldrin. Then the aforesaid solution of aldrin and ethyl parathion is sprayed into said mixer and the resulting mixture is tumbled for a period of about 15 minutes after the completion of the spraying into the mixer of said last-mentioned solution. The resulting product is relatively uniform in character. Then, while the mixer is in operation, 10 pounds of graphite powder are added and mixing is continued for several minutes or until the final composition is relatively uniform. The finished formulation contains about 10% aldrin, about 10% ethyl parathion and about 1% graphite, by weight, and is free-flowing. The presence of even small amounts of said formulation on the skin or on one's clothing is immediately visible to the naked eye.

Example 2

The same procedure described in Example 1 is carried out except that the attapulgite granules utilized are 24/48 mesh AA RVM, and the amount of graphite powder is increased so that the final formulation contains 3%, by weight, of graphite.

Example 3

The same procedure described in Example 1 is carried out except that the attapulgite granules utilized are 8/15 mesh AA RVM, and the amount of graphite powder is decreased so that the final formulation contains 0.5%, by weight, of graphite.

Example 4

200 pounds of technical aldrin (95% active) are dissolved in 115 pounds of heavy aromatic naphtha. 685 pounds of attapulgite granules 15/30 mesh AA RVM are placed in a closed tumbler mixer and, while the mixer is in operation, the aforesaid aldrin solution is sprayed onto said attapulgite granules and mixing is continued until the granules are relatively uniform in character. Then, while the mixer is in operation, 12 pounds of graphite powder are added and mixing is continued until the final composition is relatively uniform. The finished formulation contains about 1.18% graphite, by weight, and is free-flowing.

What I claim as new and desire to protect by Letters Patent of the United States is:

1. A granular pesticidal compositon comprising a pesticidally effective amount of a pesticide and a carrier therefor, said composition embodying graphite as a coating on the granules thereof whereby the presence of said composition on a surface may be readily observable to the naked eye.

2. A granular pesticidal composition comprising a pesticidally effective amount of a pesticide and a carrier therefor, said composition embodying from 0.1 to 3% of graphite, by weight of said composition, as a coating on the granules of said composition, whereby the presence of said composition on a surface may be readily observable to the naked eye.

3. A granular pesticidal composition comprising a pesticidally effective amount of a pesticide selected from the group consisting of insecticides and herbicides, and a carrier therefor, said composition embodying powdered graphite therein in a form substantially as a coating on the granules, the graphite being present in amounts in the range of 0.5 to 2%, by weight of said composition, whereby the presence of said composition on a surface may be readily observable to the naked eye.

4. A granular pesticidal composition comprising a pesticidally effective amount of a pesticide selected from the group consisting of aldrin and ethyl parathion and mixtures thereof, a clay-like carrier, and a powdered graphite, said graphite being present in amounts in the range of 0.1 to 3%, by weight of said composition, and mainly as a coating on said granules, whereby the presence of said composition on the surface may be readily observable to the naked eye.

5. A granular pesticidal composition comprising a pesticidally effective amount of a pesticide selected from the group consisting of aldrin and ethyl parathion and mixtures thereof, an attapulgite carrier, and powdered graphite, said graphite being present in amounts in the range of 0.5 to 2%, by weight of said composition, and mainly as a coating on said granules, whereby the presence of said composition on a surface may be readily observable to the naked eye.

References Cited

UNITED STATES PATENTS

| | | | |
|---|---|---|---|
| 2,423,457 | 7/1947 | Lynn et al. | 167—42 |
| 2,526,648 | 10/1950 | Freed | 167—30 |
| 2,992,090 | 7/1961 | Littler | 71—2.5 |
| 3,028,305 | 4/1962 | Alvin et al. | 167—42 |
| 3,143,460 | 8/1964 | Pearce | 167—42 |
| 3,264,176 | 8/1966 | Rapport | 167—24 |
| 3,264,184 | 8/1966 | Geiger et al. | 167—53 |

OTHER REFERENCES

Funakubo et al., cited in Chemical Abstracts 60, 2354 (1964).

LEWIS GOTTS, Primary Examiner

M. M. KASSENOFF, Assistant Examiner

U.S. Cl. X.R.

71—65, 122; 424—200, 213, 218, 219, 225, 278, 303, 308, 341, 347, 352, 354